United States Patent [19]

Kilham

[11] Patent Number: 4,690,101

[45] Date of Patent: Sep. 1, 1987

[54] BIRD FEEDER WITH ADJUSTABLE FEED TRAY

[76] Inventor: Peter Kilham, Mill Rd., Foster, R.I. 02825

[21] Appl. No.: 879,260

[22] Filed: Jun. 27, 1986

Related U.S. Application Data

[63] Continuation-in-part of Ser. No. 735,220, May 17, 1985, abandoned.

[51] Int. Cl.[4] .............................................. A01K 39/01
[52] U.S. Cl. .................................................. 119/52 R
[58] Field of Search ................ 119/24, 26, 51 R, 52 R

[56]  References Cited

U.S. PATENT DOCUMENTS

| | | | |
|---|---|---|---|
| 2,344,367 | 3/1944 | Pueschel | 119/52 R |
| 3,136,296 | 6/1964 | Luin | 119/52 R |
| 4,144,842 | 3/1979 | Schlising | 119/52 R |
| 4,246,869 | 1/1981 | Tobin, Jr. | 119/51 R |

FOREIGN PATENT DOCUMENTS 499617  1/1939  United Kingdom ............ 119/51 R

Primary Examiner—Robert P. Swiatek
Attorney, Agent, or Firm—Robert J. Doherty

[57]  ABSTRACT

In combination with a bird feeder including a vertically disposed hollow housing having a peripheral side wall, a removable top cover and a bottom wall and at least one aperture in the side wall, a combination baffle, seed tray and perch device adapted for mounting on the outside of the side wall and including a collar adapted for slidable engagement with the side wall. The relationship of the device vis-a-vis the housing can be fixed in such a manner that the collar may at least partially obstruct the aperture so as to regulate the flow of seed therethrough. The device is preferably formed as an integral unit and includes a tray portion radially outwardly extending from the collar and terminating in an upstanding rim further provided with a plurality of radially extending circumferentially spaced perches. The aperture is preferably elongated and is positioned at an angle between 30 degrees and 60 degrees and preferably is about ⅜" wide and 1" long.

19 Claims, 7 Drawing Figures

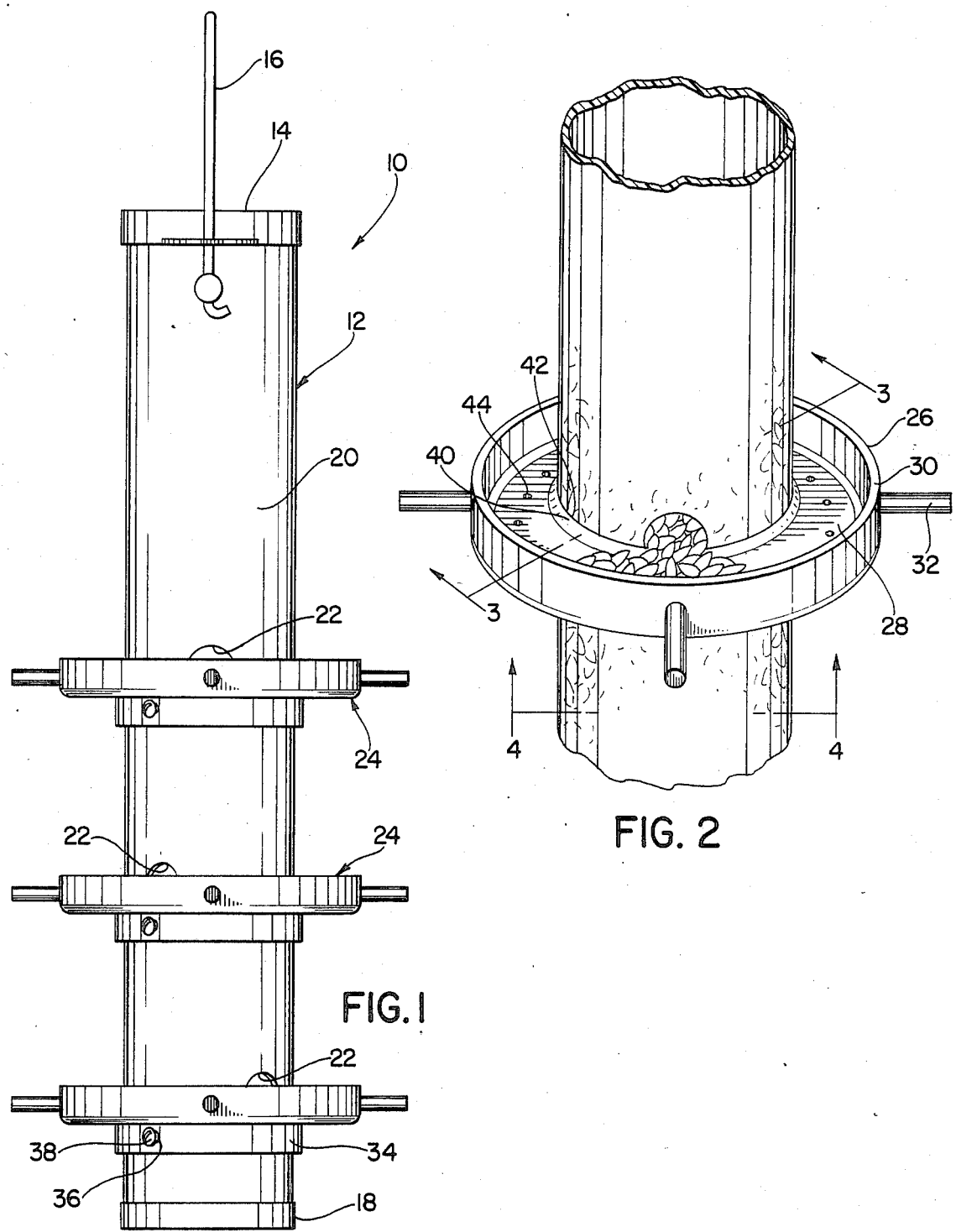

BIRD FEEDER WITH ADJUSTABLE FEED TRAY

BACKGROUND AND OBJECTS OF THE INVENTION

This application is a continuation-in-part of application Ser. No. 735,220 filed May 17, 1985 and now abandoned.

This invention is directed to a bird feeder and more particularly to a bird feeder of novel construction which simultaneously accomplishes several objectives of bird feeders in general. One such objective is to produce a feeder which is capable of regulating the flow of seed from a supply housing to a surface or area which is accessible to the birds. In this manner, the same feeding device in various adjusted modes can be utilized to successfully dispense large seed such as sunflower seed as well as much smaller seed such as millet, niger, etc. In this way various bird species can be either alternatively or simultaneously attracted to the same feeding device.

Another objective of the present invention is to both extend and expand the utility of known bird feeder devices of the type shown in one of my previous patents, namely, U.S. Pat. No. 3,568,641 issued Mar. 9, 1971. In such patent, a bird feeder with a hollow tubular housing is provided with openings through the side wall thereof with such openings in receipt of a reinforcing baffle such that seed is maintained within the housing yet accessible to the birds. While such bird feeder admirably accomplishes its objectives and, in fact, has become a standard in the industry, it is limited to the extent that some birds such as those which prefer to feed from an open tray are essentially barred therefrom. Thus it would desirable to be able to modify or at least to use the basic tubular housing of such above-described feeder so as to provide a different type feeder having equal attraction to a wider variety of birds and the ability to take advantage of already available components in producing a different feeder.

These and further objectives of the present invention are accomplished by the provision of a combination baffle, seed tray, and perch device adapted for mounting on the outside of a side wall of a bird feeder including a vertically disposed hollow housing having a peripheral side wall, a removable top cover, and bottom wall, and at least one aperture in said side wall such that seed disposed in said housing at a height above said aperture may normally pass freely as by gravity therethrough, said device including a vertically disposed peripheral collar of a configuration similar to said side wall and of a height at least essentially equal to the height of said side wall opening and adapted to receive said housing therein with the inside of said collar and the outside of adjacent side wall portions in slidable face to face contact such that said collar may move across said opening and, accordingly, cover said opening from a slight to an essentially complete obstruction thereof, mounting means for adjustably fixing the position of said collar vis-a-vis said housing whereby the flow of seed from said housing through the uncovered portion of said opening is determined, said device further including a tray having an essentially flat inner rim portion outwardly extending from the periphery of said collar and an outer lip portion upwardly extending from said rim inner portion such that seed passing by gravity from said housing through said opening collect on said tray.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a side elevational view showing a preferred form of the invention wherein three devices of the present invention are shown in mounted operative position upon a feeder housing;

FIG. 2 is partial perspective view showing a portion of the feeder body with one of the devices of the present invention shown mounted thereon and the manner in which seed is dispensed therefrom;

DESCRIPTION OF THE INVENTION

Figure 3:
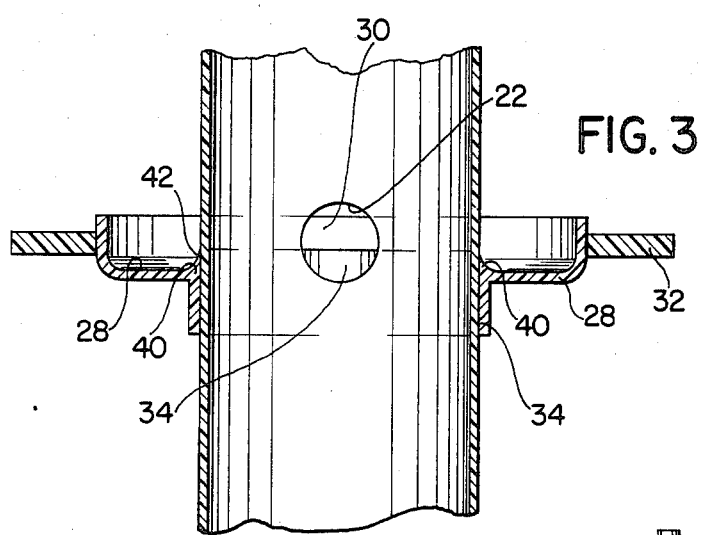
FIG. 3 is a partial side sectional view taken along the line 3—3 of FIG. 2.

Referring now to the drawings and particularly FIG. 1 thereof, the bird feeder 10 of the present invention includes a hollow cylindrical or tubular body 12 having a suitable top cover 14 including a handle 16 and a bottom closure 18. The body 12 is adapted for vertically orientation as shown and is preferably made from an essentially transparent plastic material such as Lexan. The circumferential side wall 20 of the body 12 includes a plurality of openings 22 therethrough. The openings 22 are disposed at different levels, three such levels being illustrated, preferably with two laterally opposed openings 22 at each level although it should be clear that more than two openings may be present at each level and that more or less levels may be utilized. In essence, seed is introduced into the body 12 via the removable cover 14 and is allowed to pass outwardly through the openings 22.

In order to facilitate the receipt of the seed moving from the body 12 through the openings, a novel device 24 is positioned at each of the levels in the manner depicted. Such device 24 is, in effect, a combination baffle, seed tray, and perch such that seed is positioned thereon in such a manner that it is accessible to a wide variety of feeding birds. It is constructed such that the height or position at which it is mounted upon the housing is vertically adjustable such that the unblocked extent of the opening or openings 22 adjacent thereto is controlled between a position wherein the full extent of the opening 22 is available for seed to pass therethrough to a position where only a minor or very small portion of the opening 22 is available for the passage of seed. The device 24 is also preferably formed integrally of an essentially transparent plastic material such as Lexan. The device 24 includes a tray 26 formed in part by an inner essentially flat rim portion 28 and an upstanding lip 30 at the peripheral edge thereof. Radially outwardly extending from the lip 30 is a plurality of peg-like perches 32 circumferentially spaced about the perimeter of the lip 30. A circular collar 34 downwardly extends from the inner periphery of the rim 28 and is adapted to contact the outer side walls 20 of the body 12. The height of the collar 34 is essentially equal to the vertical height of the openings 22 or greater than such height for a purpose that will hereinafter explained.

Figure 4:
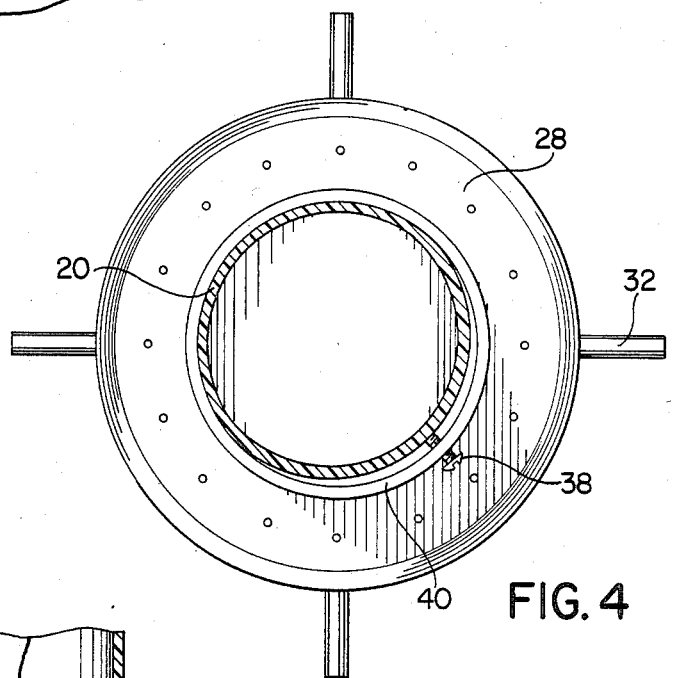
FIG. 4 is a sectional view taken along the line 4—4 of FIG. 2.

The collar 34 is provided with a horizontally directed threaded bore 36 therethrough into which a set screw 38 is threaded. Thus by vertically positioning the collar 34 vis-a-vis the openings 22 at each level thereof, the extent to which the collar blocks or baffles the opening 22 can be regulated. Once the desired extent has been achieved dependent on the size of the seed at that level of the housing, then the set screw 38 is tightened so as to fix the position of the device 24 vis-a-vis the housing 12. It is preferable that the material and thickness forming the tubular body 12 is such that the engaging pressure of the end of the set screw 38 will slightly deform the adjacent portion of the body 12 such that the opposite inner wall portions of the collar 34 are brought into tight engagement with the outer wall portions of the opposed side wall. This construction is best shown in FIG. 4 and insures a tight frictional engagement between the collar 34 an the outer side wall.

Figure 5:
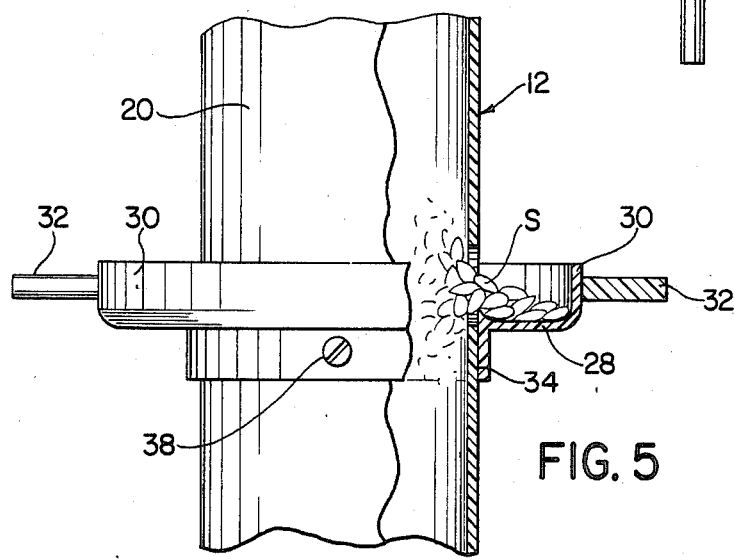
FIG. 5 is an elevational view similar to FIG. 3 but partly in section showing the manner in which seed flows from the housing body of the feeder through the opening and onto the tray portion of the device of the present invention.

Naturally when larger seed is being utilized in the body, the unbaffled vertical extent of the opening 22 will be greatest such as shown in FIG. 5 of the drawings. As illustrated therein, the seed S is to some extent free to move by gravity from the housing 12 through the unbaffled portion of the opening 22 and on to the rim 28 of the tray 26 until it engages the upstanding lip 30. It is desirable that the opening be such that it permits the seed to gently flow at least in part by gravity into a natural mound where the outer extent thereof preferably slightly contacts the lip 30. It has been found that it is also important that the opening or openings 22 be accessible at least to the extent that birds can peck at the seed within the housing when the seed temporarily will not flow as caused by a bridging effect and thus dislodge the seed and enable the seed to flow again. It is equally important that the opening or openings not be too large as well since at least with some seed, an excessively large opening or openings could cause a non stop or at least an excessively free seed flow such that it is blown away by the wind or otherwise scattered. The adjustability of the device of this invention enables the desired effective opening to be arrived at and thus accomplish the desired seed flow within the parameters as above explained. A small portion 40 of the collar 34 preferably extends above the rim and terminates in a narrow edge 42 adjacent the housing. This portion is upwardly inwardly slanted so as to, in effect, provide a ramp for the seed to be directed into for better distribution to the rim 28. The sharp edge 42 also reduces dust, tiny seed particles from entering between the collar and the housing. When smaller seed is utilized, the collar 34 is upwardly adjusted such that a much smaller portion of the opening 22 is left unblocked or baffled by the vertical extent of the collar 34.

It should be pointed out that the individual devices 24 when more than one is utilized in connection with a bird feeder may be adjusted for different seed or seed flow rates as desired or may be utilized to completely block the passage of seed to one or more of such devices 24. In addition, the floor of the rim 28 is provided with a plurality of drain openings 44 to facilitate the drainage from rain water and the like that might otherwise accumulate in the tray portion 26.

Figure 6:
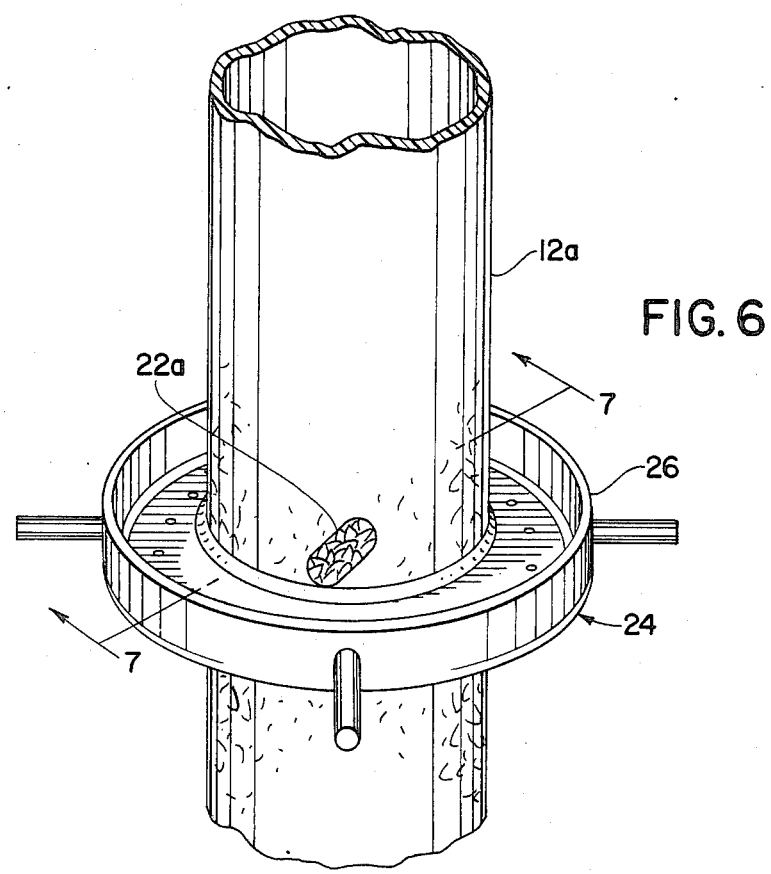
FIG. 6 is a partial perspective view showing a portion of an alternative and preferred feeder body construction in combination with a combination baffle, seed tray and perch device mounted thereon.
Figure 7:
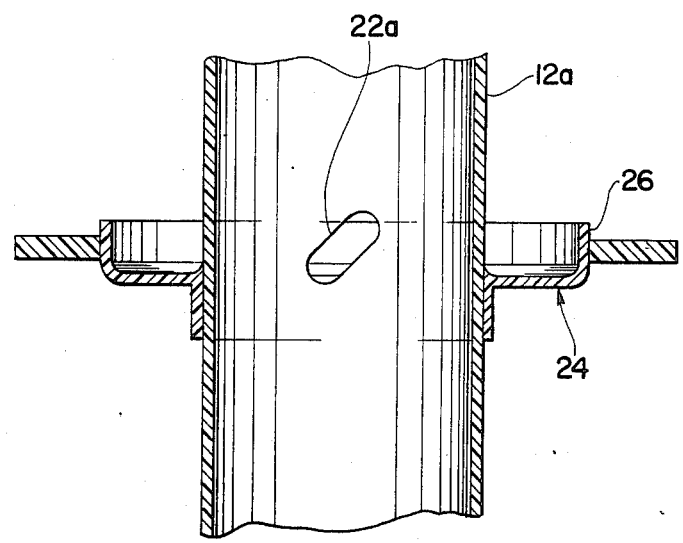
FIG. 7 is a sectional view taken along line 7—7 of FIG. 6.

Turning now to FIGS. 6 and 7 of the drawings, the device 24 is shown in cooperation with a body 12a of modified and preferred construction. Therein the body 12a is essentially the same as body 12 except for the extent and shape of the openings 22a provided therethrough. Such openings 22a are in the form of generally elongated oval or rounded corner rectangular shape and preferably ⅜" in width and about 1" in length. The reason for the elongated shape is that with the round opening previously described it was found that birds occasionally got their heads stuck in the openings since it is easier for them to push in because of the lie of their feathers than to pull out. The elongated shape and the above described width of the openings or slots 22a eliminates this problem since it is too narrow for the bird to extend its head through.

The slots 22a are preferably oriented at an angle of between 30 and 60 degrees to the horizontal. Since the seeds held in the body 12a tend to bridge across the openings 22a, the seed is normally held thereon rather than continually spilling out upon the tray 26 until a bird pecks at it. Birds feed by pecking downwardly and this action breaks the seed bridging and allows some seed to flow onto the tray 26. If the slots were aligned vertically, this bridge disturbing pecking would stimulate a whole stream of seed the length of the slot which would result in excessive seed flow while a horizontal alignment would produce a very insignificant seed flow, if any, because of the minor height of the slot in such an orientation. Therefore the 30 to 60 degree placement has been found to produce the desired results. Thus when the larger seeds bridge over the slots 22a, the above described pecking by the birds breaks this bridging and starts seed flow which is adequate to allow a small amount of seed to flow until further seed bridging occurs. Thus the feeder allows birds to peck to get and loosen seed yet restrains seed when no birds are present so that it will not be wasted by being spilled on the ground or blown away.

By moving the tray to regulate the vertical extent of the slots 22a, the above described flow can be achieved with various size feed. Thus with large seeds such as sunflower, etc. the full opening is accessible while the tray is progressively moved up to block more of the slot height for smaller seed, e.g., for medium seed the tray is moved up on half of the slot height thus exposing a reduced slot of about ⅜" by ½", and for small seed three quarters of the way up to expose an even further reduced slot opening of ⅜" by ¼". Of course, all these sizes and dimensions are approximate and by example only since the object is to achieve a variable slot opening to suit different seed mixes and achieve the above described bridge and flow characteristics.

It should thus be apparent that the overall objectives of the present invention are accomplished by the present device and that such may be utilized both in conjunction with presently available tubular housing portions of bird feeders or with housings specifically designed with a combination use. In either event, a wide variety of seed may be dispensed in a novel fashion so as to facilitate the attraction of a wider variety of birds then hitherto achievable.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a bird feeder including a vertically disposed hollow housing having a peripheral side wall, a removable top cover, a bottom wall, and at least one aperture in said side wall such that seed disposed in said housing at a height above said at least one aperture may normally pass freely as by gravity therethrough, the improvement comprising: a combination baffle, seed tray and perch device adapted for mounting on the outside of said side wall, said device including a vertically disposed peripheral collar of a configuration similar to said side wall and of a height at least essentially equal to the height of said at least one aperture and adapted to receive said housing therein with the inside of said collar and the outside of adjacent side wall portions in slidable face to face contact such that said collar may move across and accordingly cover said at least one aperture from a slight to an essentially complete obstruction thereof, mounting means for adjustably fixing the position of said collar vis-a-vis said housing whereby the flow of seed from said housing through the uncovered portion of said at least one aperture is determined, and said device further including a tray having an essentially flat inner rim portion outwardly extending from the periphery of said collar such that seed passing by gravity from said housing through said at least one aperture collects on said tray.

2. The bird feeder of claim 1, said housing including a tubular body wherein said side wall and said collar are circular.

3. The bird feeder of claim 2 wherein said tubular body and said device are formed from an essentially transparent plastic material.

4. The bird feeder of claim 3, said plastic material being Lexan.

5. The bird feeder of claim 2, said at least one aperture being circular.

6. The bird feeder of claim 2, said at least one aperture being an elongated slot disposed at an angle of between 30 degrees and 60 degrees.

7. The bird feeder of claim 6, said at least one aperture being about ⅜" wide and 1" long.

8. The bird feeder of claim 1, said collar downwardly extending from said rim portion.

9. The bird feeder of claim 1, including an outer lip portion upwardly extending from the periphery of said rim portion.

10. The bird feeder of claim 9, said outer lip portion including outwardly extending integral perches.

11. The bird feeder of claim 9, said collar extending downwardly from said tray rim portion and wherein radially extending circumferentially spaced perches are integrally formed on said outer lip portion.

12. In a bird feeder including a vertically disposed hollow housing having a peripheral side wall, a removable top cover, a bottom wall, and at least one aperture in said side wall such that seed disposed in said housing at a height above said at least one aperture may normally pass freely as by gravity therethrough, the improvement comprising: a combination baffle, seed tray and perch device adapted for mounting on the outside of said side wall, said device including a vertically disposed peripheral collar of a configuration similar to said side wall and of a height at least essentially equal to the height of said at least one aperture and adapted to receive said housing therein with the inside of said collar and the outside of adjacent side wall portions in slidable face to face contact such that said collar may move across and accordingly cover said at least one aperture from a slight to an essentially complete obstruction thereof, mounting means for adjustably fixing the position of said collar vis-a-vis said housing whereby the flow of seed from said housing through the uncovered portion of said at least one aperture is determined, and said device further including a tray having an essentially flat inner rim portion outwardly extending from the periphery of said collar such that seed passing by gravity from said housing through said at least one aperture collects on said tray, said housing including a tubular body wherein said side wall and said collar are circular, said mounting means including a set screw received in a bore transversely oriented through said collar.

13. The bird feeder of claim 12, said body formed of a slightly deformable plastic material such that tightening of said set screw engages the adjacent side wall portion so as to slightly flatten the same while urging the collar into tight engagement with the opposite side wall portion.

14. The bird feeder of claim 13, said bore positioned through a portion of said collar downwardly extending from said rim portion.

15. In a bird feeder including a vertically disposed hollow housing having a peripheral side wall, a removable top cover, a bottom wall, and at least one aperture in said side wall such that seed disposed in said housing at a height above said at least one aperture may normally pass freely as by gravity therethrough, the improvement comprising: a combination baffle, seed tray and perch device adapted for mounting on the outside of said side wall, said device including a vertically disposed peripheral collar of a configuration similar to said side wall and of a height at least essentially equal to the height of said at least one aperture and adapted to receive said housing therein with the inside of said collar and the outside of adjacent side wall portions in slidable face to face contact such that said collar may move across and accordingly cover said at least one aperture from a slight to an essentially complete obstruction thereof, mounting means for adjustably fixing the position of said collar vis-a-vis said housing whereby the flow of seed from said housing through the uncovered portion of said at least one aperture is determined, and said device further including a tray having an essentially flat inner rim portion outwardly extending from the periphery of said collar such that seed passing by gravity from said housing through said at least one aperture collects on said tray, said housing including a tubular body wherein said side wall and said collar are circular, there being a plurality of said devices mounted at different levels in spaced vertical relation on said tubular body and said side wall having at least one or more openings at each such level.

16. In a bird feeder including a vertically disposed hollow housing having a peripheral side wall, a removable top cover, a bottom wall, and at least one aperture in said side wall such that seed disposed in said housing at a height above said at least one aperture may normally pass freely as by gravity therethrough, the improvement comprising: a combination baffle, seed tray and perch device adapted for mounting on the outside of said side wall, said device including a vertically disposed peripheral collar of a configuration similar to said side wall and of a height at least essentially equal to the height of said at least one aperture and adapted to receive said housing therein with the inside of said collar and the outside of adjacent side wall portions in slidable face to face contact such that said collar may move across and accordingly cover said at least one aperture from a slight to an essentially complete obstruction thereof, mounting means for adjustably fixing the position of said collar vis-a-vis said housing whereby the flow of seed from said housing through the uncovered portion of said at least one aperture is determined, and said device further including a tray having an essentially flat inner rim portion outwardly extending from the periphery of said collar such that seed passing by gravity from said housing through said at least one aperture collects on said tray, said collar downwardly extending from said rim portion, said collar having a minor portion upwardly extending and inwardly slanting from said rim portion, said collar minor portion terminating upwardly in a narrow edge positioned adjacent said housing.

17. In a bird feeder including a vertically disposed hollow housing having a peripheral side wall, a removable top cover, a bottom wall, and at least one aperture in said side wall such that seed disposed in said housing at a height above said at least one aperture may normally pass freely as by gravity therethrough, the improvement comprising: a combination baffle, seed tray and perch device adapted for mounting on the outside of said side wall, said device including a vertically disposed peripheral collar of a configuration similar to said side wall and of a height at least essentially equal to the height of said at least one aperture and adapted to receive said housing therein with the inside of said collar and the outside of adjacent side wall portions in slidable face to face contact such that said collar may move across and accordingly cover said at least one aperture from a slight to an essentially complete obstruction thereof, mounting means for adjustably fixing the position of said collar vis-a-vis said housing whereby the flow of seed from said housing through the uncovered portion of said at least one aperture is determined, and said device further including a tray having an essentially flat inner rim portion outwardly extending from the periphery of said collar such that seed passing by gravity from said housing through said at least one aperture collects on said tray, said housing including a tubular body wherein said side wall and said collar are circular, wherein said tubular body and said device are formed from an essentially transparent plastic material, there being a plurality of said devices mounted at different levels in spaced vertical relation on said tubular body, each of said devices being independently vertically adjustable on said tubular body.

18. In a bird feeder including a vertically disposed hollow housing having a peripheral side wall, a removable top cover, a bottom wall, and at least one aperture of elongated configuration and positioned at an angle of between about 30 degrees and about 60 degrees in said side wall such that seed disposed in said housing at a height above said at least one aperture may normally pass freely as by gravity therethrough, the improvement comprising: a combination baffle, seed tray and perch device adapted for mounting on the outside of said side wall, said device including a vertically disposed peripheral collar of a configuration similar to said side wall and of a height at least essentially equal to the height of said at least one aperture and adapted to receive said housing therein with the inside of said collar and the outside of adjacent side wall portions in slidable face to face contact such that said collar may move across and accordingly cover said at least one aperture from a slight to an essentially complete obstruction thereof, mounting means for adjustably fixing the position of said collar vis-a-vis said housing whereby the flow of seed from said housing through the uncovered portion of said at least one aperture is determined, and said device further including a tray having an essentially flat inner rim portion outwardly extending from the periphery of said collar such that seed passing by gravity from said housing through said at least one aperture collects on said tray.

19. The bird feeder of claim 18, said at least one aperture being about $\frac{3}{8}''$ wide and 1" long.

* * * * *